US006363907B1

(12) United States Patent
Arai et al.

(10) Patent No.: US 6,363,907 B1
(45) Date of Patent: Apr. 2, 2002

(54) AIR INDUCTION CONTROL SYSTEM FOR VARIABLE DISPLACEMENT INTERNAL COMBUSTION ENGINE

(75) Inventors: Masahiro Arai; Hatsuo Nagaishi, both of Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/686,992

(22) Filed: Oct. 11, 2000

(30) Foreign Application Priority Data

Oct. 15, 1999 (JP) .......................................... 11-294338

(51) Int. Cl.[7] ............................................... F02B 77/00
(52) U.S. Cl. ..................................... 123/198 F; 123/21
(58) Field of Search ............................. 123/198 F, 21, 123/90.11

(56) References Cited

U.S. PATENT DOCUMENTS

| 4,550,704 A | 11/1985 | Barho et al. ................. 123/481 |
| 5,005,539 A | 4/1991 | Kawamura .................... 123/21 |
| 5,022,353 A | 6/1991 | Kawamura .................... 123/21 |
| 5,113,805 A | 5/1992 | Kawamura .................... 123/21 |
| 5,398,544 A | * 3/1995 | Lipinski et al. .......... 123/198 F |
| 5,515,818 A | 5/1996 | Born ........................ 123/90.11 |
| 5,540,633 A | 7/1996 | Yamanaka et al. .......... 477/107 |
| 5,562,086 A | 10/1996 | Asada et al. ................ 123/571 |
| 5,592,905 A | 1/1997 | Born ........................ 123/90.11 |
| 5,730,091 A | 3/1998 | Diehl et al. ............... 123/90.11 |
| 5,769,043 A | 6/1998 | Nitkiewicz ................ 123/90.11 |
| 5,826,563 A | * 10/1998 | Patel et al. .............. 123/198 F |
| 5,873,335 A | 2/1999 | Wright et al. ............. 123/90.11 |
| 6,003,481 A | 12/1999 | Pischinger et al. ........ 123/90.11 |
| 6,125,812 A | * 10/2000 | Garabedian ............. 123/198 F |

FOREIGN PATENT DOCUMENTS

| JP | 6-159110 | 6/1994 |
| JP | 8-74610 | 3/1996 |

* cited by examiner

Primary Examiner—Noah P. Kamen
(74) Attorney, Agent, or Firm—Foley & Lardner (57) ABSTRACT

A control system for a variable displacement internal combustion engine determines effective flow cross sectional area as a predetermined function of a cross sectional area given against a throttle position. The effective flow cross sectional area is used to determine a volumetric airflow ratio. A control unit is connected with cylinder operator means for deactivating and reactivating at least some of engine cylinders and varying strokes in a cycle. The control unit modifies the predetermined function in response to the number of cylinders being activated and the number of strokes in a current cycle.

16 Claims, 13 Drawing Sheets

|  |  |  |  |
|---|---|---|---|
|  |  |  |  |
|  |  |  |  |

INST. ACCEL. POSITION

ENGINE SPEED

| | 1st. REV. | | 2nd. REV. | | 3rd. REV. | | 4th. REV. | | 5th. REV. | | 6th. REV. | | 7th. REV. | | 8th. REV. | |
|---|---|---|---|---|---|---|---|---|---|---|---|---|---|---|---|---|
| | 180deg. | 180deg. | 180deg. | 180deg. | 180deg. | 180deg. | 180deg. | 180deg. | 180deg. | 180deg. | 180deg. | 180deg. | 180deg. | 180deg. | 180deg. | 180deg. |
| 4 CYCLE | | | | | | | | | | | | | | | | |
| #1 | IND | COM | POW | EXH | IND | COM | POW | EXH | IND | COM | POW | EXH | IND | COM | POW | EXH |
| #2 | COM | POW | EXH | IND | COM | POW | EXH | IND | COM | POW | EXH | IND | COM | POW | EXH | IND |
| #3 | EXH | IND | COM | POW | EXH | IND | COM | POW | EXH | IND | COM | POW | EXH | IND | COM | POW |
| #4 | POW | EXH | IND | COM | POW | EXH | IND | COM | POW | EXH | IND | COM | POW | EXH | IND | COM |
| 8 CYCLE | | | | | | | | | | | | | | | | |
| #1 | IND | COM | EXP | REC1 | REE | REC2 | POW | EXH | IND | COM | EXP | REC1 | REE | REC2 | POW | EXH |
| #2 | EXP | REC1 | REE | REC2 | POW | EXH | IND | COM | EXP | REC1 | REE | REC2 | POW | EXH | IND | COM |
| #3 | POW | EXH | IND | COM | EXP | REC1 | REE | REC2 | POW | EXH | IND | COM | EXP | REC1 | REE | REC2 |
| #4 | REE | REC2 | POW | EXH | IND | COM | EXP | REC1 | REE | REC2 | POW | EXH | IND | COM | EXP | REC1 |
| 16 CYCLE | | | | | | | | | | | | | | | | |
| #1 | IND | COM | EXP | REC1 | REE1 | REC2 | REE2 | REC3 | REE3 | REC4 | REE4 | REC5 | REE5 | REC6 | POW | EXH |
| #2 | REC1 | REE1 | REC2 | REE2 | REC3 | REE3 | REC4 | REE4 | REC5 | REE5 | REC6 | POW | EXH | IND | COM | EXP |
| #3 | REE5 | REC6 | POW | EXH | IND | COM | EXP | REC1 | REE1 | REC2 | REE2 | REC3 | REE3 | REC4 | REE4 | REC5 |
| #4 | REC3 | REE3 | REC4 | REE4 | REC5 | REE5 | REC6 | POW | EXH | IND | COM | EXP | REC1 | REE1 | REC2 | REE2 |

IND=INDUCTION STROKE, COM=COMPRESSION STROKE, POW=POWER STROKE, EXH=EXHAUST STROKE
EXP=EXPANSION STROKE, REC=RECOMPRESSION STROKE, REE=REEXPANSION STROKE

| N_DACT | 0 | 1 | 2 | 3 |
|---|---|---|---|---|
| K_DACT | 4/4 | 3/4 | 2/4 | 1/4 |

FIG.12

| N_STRK | 4 | 8 | 16 | 32 |
|---|---|---|---|---|
| K_STRK | 4/4 | 4/8 | 4/16 | 4/32 |

AIR INDUCTION CONTROL SYSTEM FOR VARIABLE DISPLACEMENT INTERNAL COMBUSTION ENGINE

BACKGROUND OF THE INVENTION

1. Field of the Invention

The present invention relates to a system for controlling the flow of air entering the intake manifold of a multicylinder variable displacement internal combustion engine installed in a vehicle having a driver operable accelerator control

2. Terminology

Maximum Air Induction

This is used herein to mean the volume of air admitted in cylinders of an engine per minute when the engine operates at an engine speed with a throttle disposed held in wide open throttle (WOT) position. The maximum air induction varies as the engine speed varies. Thus, a lookup table is used to provide an appropriate value of the maximum air induction at a given engine speed. In the description, the reference character "MAXTP" is used to represent the "maximum air induction".

Displacement

This is used herein to mean the volume swept out in one stroke by a piston in a cylinder. "Cylinder displacement" is a synonym.

Total of Displacements of Cylinders

This is used herein to mean the sum of displacement of each of cylinders of an engine. "Engine displacement" and "displacement of an engine" are synonyms. In the description, the reference character "VOL#" is used to represent the "engine displacement".

Volumetric Airflow Ratio

This is used herein to mean a ratio between the volumetric airflow admitted to activated ones of cylinders of an engine through a given effective flow cross sectional area and the maximum volumetric airflow admitted to all of the cylinders of the engine through the maximum effective flow cross sectional area. The maximum effective flow cross sectional area is provided when all the cylinder of the engine are in operation and a throttle in an intake manifold is WOT position. In the description, the reference character "TQHOST" is used to represent the "volumetric airflow ratio" and this ratio is expressed in terms of percentage (%).

Target Base Airflow

This is used herein to mean a target value of a base volume of airflow entering the engine and can be expressed as the product of ("volumetric airflow ratio")×("maximum air induction"). In the description, the reference character "TTPST" is used to represent the "target base airflow".

Operator

This is used herein to mean hardware and/or software used to operate a throttle or an exhaust gas recirculation (EGR) control valve or each of cylinders of an engine. For example, "throttle operator" is used herein to mean an actuator, such as a stepper motor, and its associated software for operating a throttle. "EGR operator" is used herein to mean an actuator, such as a stepper motor, and its associated software for operating an EGR control valve. "Engine cylinder operator" is used herein to mean hardware and software for deactivating and reactivating a cylinder and/or for varying strokes in a cycle.

3. Description of Related Art

Figure 8:
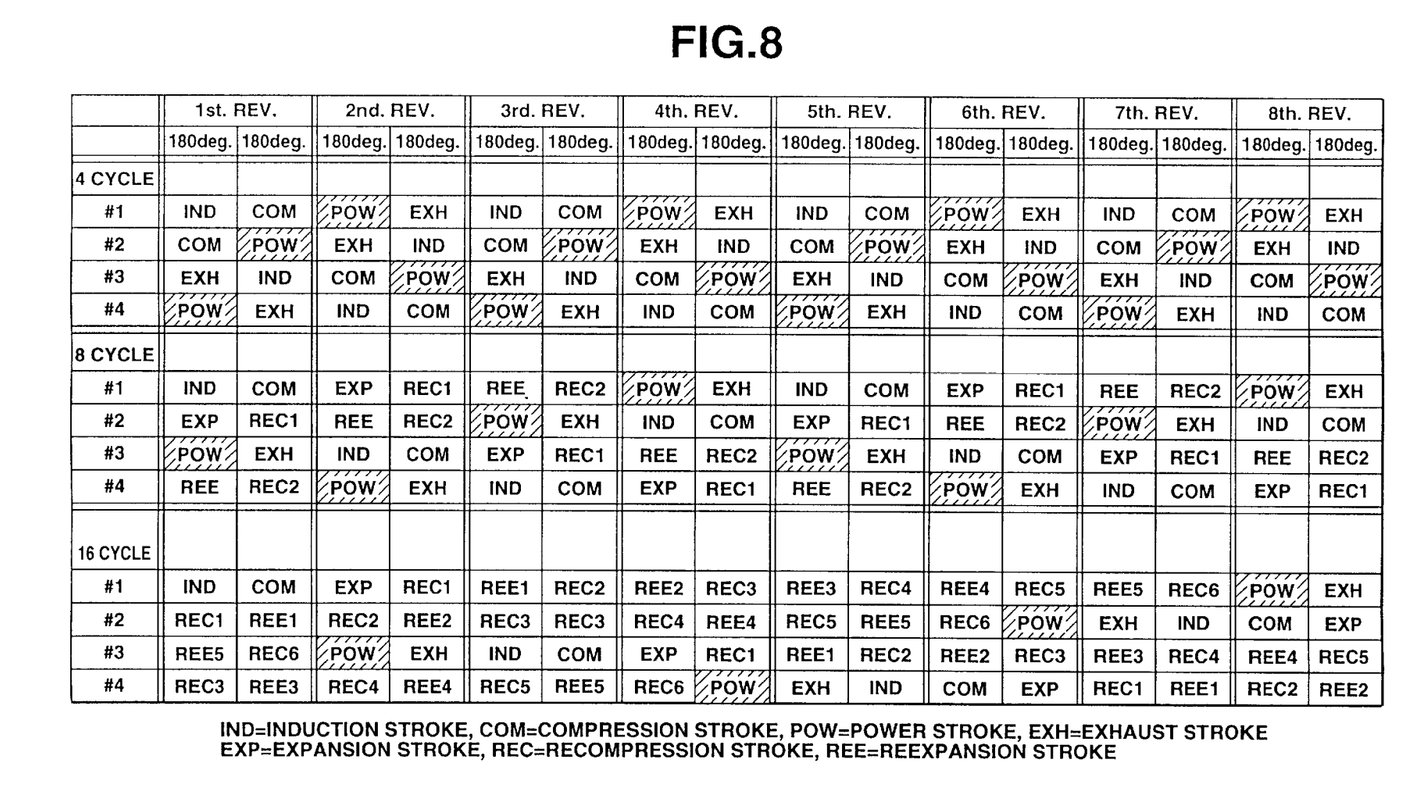
FIG. 8 is a table showing the events of strokes in 4-stroke cycle, 8-stroke cycle and in 16-stroke cycle over eight crankshaft revolutions.

Automotive designers and manufactures have realized for years that it is possible to obtain increased fuel efficiency if an engine can be operated on less than the full complement of cylinders during certain running condition and/or it can be operated on increased number of strokes in a cycle, Accordingly, it is possible to save fuel if the engine can be run on four instead of eight cylinders or three instead of six cylinders or two instead of four cylinders. Further, it is possible to save fuel if the engine an be run on eight-stroke or sixteen-stroke cycle instead of four-stroke cycle. Unfortunately, the engines of the above kind suffered from deficiencies associated with their control strategies. Specifically, the amount of air entering the engine per two crankshaft revolutions corresponding to a given accelerator pedal position at a given engine speed varied quiet widely with the number of activated cylinders and/or the number of strokes in a cycle of the activated cylinders. Referring to FIG. 8, for example, when the engine is in full-cylinder operation in 4-stroke cycle mode, there are four (4) induction stroke events in two crankshaft revolutions. However, when the engine is in 8-stroke cycle mode, there are two (2) induction stroke events in two crankshaft revolutions. Further, when the engine is in 16-stroke cycle mode, each of the cylinders performs induction stroke in eight crankshaft revolutions. This means that there is one induction stroke event in two crankshaft revolutions. Thus, a need remains to determine, with increased accuracy, the volume of air entering cylinders of an engine against varying operation modes of the engine.

The present invention aims at providing, with increased accuracy, a parameter indicating volume airflow ratio against varying operation modes of the engine.

It is an object of the present invention to provide a control system for an internal combustion engine, which has implemented the above-mentioned technique.

SUMMARY OF THE INVENTION

According to one aspect of the present invention, there is provided a control system for an internal combustion engine having a plurality of cylinders, comprising:

engine cylinder operator means for varying displacement of the engine cylinders;

means generating a cross sectional area against a given throttle position out of stored various cross sectional areas against various throttle positions;

means for determining an effective flow cross sectional area as a predetermined function of said cross sectional area;

means for generating a volumetric airflow ratio corresponding to said effective flow cross sectional area; and means for modifying said predetermined function in response to a change in displacement of the engine cylinders.

According to a specific aspect of the present invention, there of provided a control system for an internal combustion engine having a plurality of cylinders, comprising:

engine cylinder operator means for deactivating and reactivating the engine cylinders and varying the number of strokes in a cycle; and a control unit connected with said engine cylinder operator means, said control unit generating a cross sectional area against a given throttle position out of stored various cross sectional areas against various throttle positions;

said control unit determining an effective flow cross sectional area as a predetermined function of said cross sectional area;

said control unit generating an airflow command corresponding to said effective flow cross sectional area; and said control unit modifying said predetermined function in response to the number of engine cylinders being activated and the number of strokes in cycle.

If all of the engine cylinders are being activated with strokes in the standard cycle, the predetermined function is expressed such that the effective flow cross sectional area is equivalent to the cross sectional area divided by the total of displacements of the engine cylinders and also by engine speed.

DESCRIPTION OF THE PREFERRED EMBODIMENTS

Figure 1:
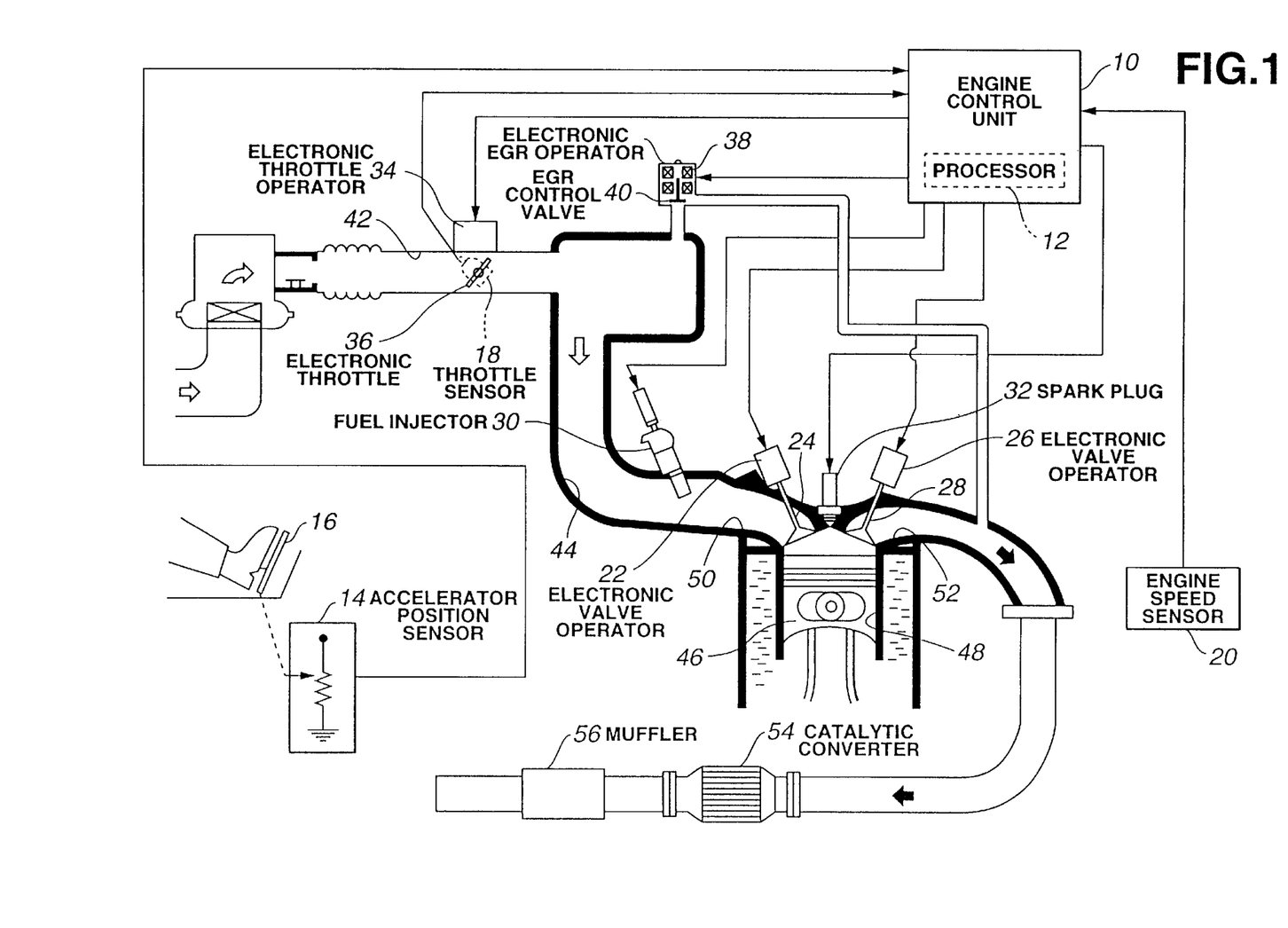
FIG. 1 is a pictorial view of a four-stroke four-cylinder internal combustion engine installed in a vehicle having a driver-operable accelerator pedal, showing the relationship between an engine control unit and the engine components.

As shown in FIG. 1, an air induction control system for controlling airflow into the intake manifold of a variable displacement automotive engine includes a microprocessor control unit 10 of the type commonly used to provide engine control. This engine has four-stroke cycle as its standard cycle. Control unit 10 contains microprocessor 12 that includes, in the usual manner, a read only memory (ROM), a random access memory (RAM), a central processor unit (CPU) and an input output (I/O) unit. Control unit 10 receives information from an accelerator position sensor 14 operatively associated with a driver-operable accelerator pedal 16, a throttle sensor 18 operatively associated with an electronic throttle 36, and an engine speed sensor 20. Control unit 10 uses a variety of inputs from various sensors, which may include engine coolant temperature, vehicle speed, oxygen concentration, and other sensors known to those skilled in the art Control unit 10 may operate fuel injection control, spark timing control, air/fuel ratio control, EGR control and other functions. In addition, through a plurality of engine cylinder operators 21 (see FIG. 2), control unit 10 is capable of disabling selected cylinders in the engine so as to cause the engine be of a lower effective displacement. For example, with an 8-cylinder engine, the engine may be operated on 4, 5, 6 or 7 cylinders, or even 3 or 2 cylinders, as required. With a 6-cylinder engine, the engine may be operated on 3, 4 or 5 cylinders, or even 2 cylinders, as required. With a 4-cylinder engine, the engine may be operated on 2 or 3 cylinders, or even 1 cylinder, as required. Though engine cylinder operators 21, control unit 10 has also the capability of shifting from the standard cycle. For example, with a 4-stroke cycle engine, the engine may be operated on 8-stroke cycle or 16-stroke cycle, or even 32-stroke cycle, as required. FIG. 8 shows stroke events occurring in 8 crankshaft revolutions if the engine is operated on 4-stroke cycle or 8-stroke cycle or 16-stroke cycle. Through engine cylinder operators 21, control unit 10 operates electronic valve operators 22 for intake cylinder valves 24 in intake ports 50 and electronic valve operators 26 for exhaust cylinder valves 28 in exhaust ports 52, fuel injectors 30 provided in intake ports 50 and spark plugs 32. Those skilled in the art will appreciate that a number of different disabling devices are available for selectively rendering the cylinders of the engine inoperable or deactivating or reactivating them. Such devices include hydraulic valve actuators, mechanical valve actuators and electromechanical valve actuators for preventing any of the valves from opening in the disabled or deactivated cylinders, such that gas remains trapped within the cylinder. Such electromechanical valve actuators are disclosed, for example, in U.S. Pat. No. 5,730,091 issued Mar. 24, 1998 to Diehl et al. (Assignee: Ford Global Technologies, Inc.), U.S. Pat. No. 5,769,043 issued Jun. 23, 1998 to Nitkiewicz (Assignee: Siemens Automotive Corporation), U.S. Pat. No. 5,515,818 issued May 14, 1996 to Born (Assignee: Machine Research Corporation of Chicago), U.S. Pat. No. 5,592,905 issued Jan. 14, 1997 to Born (Assignee: Machine Research Corporation of Chicago), U.S. Pat. No. 6,003,481 issued Dec. 21, 1999 to Pischinger et al. (Assignee: FEV Motorentechnik GmbH & Co.), and U.S. Pat. No. 5,873,335 issued Feb. 23, 1999 to Wright et al. (Assignee: Siemens Automotive Corporation).

U.S. Pat. No. 5,873,335 shows an electronic motor control of cylinder valves of an internal combustion engine. U.S. Pat. No. 6,003,481 shows an electromagnetic valve actuator. U.S. Pat. Nos. 5,592,905 and 5,515,818 show an electromechanical variable valve actuator for selectively opening and closing an intake or exhaust valve in an internal combustion engine. U.S. Pat. No. 5,769,043 shows an electromagnetic valve actuator with a sensor for detecting the cylinder valve motion. U.S. Pat. No. 5,730,091 shows an electromechanical valve actuator including three electromagnets.

Engine cycle control systems employing electromagnetic valve actuators are available. Such systems are disclosed, for example, in U.S. Pat. No. 5,005,539 issued Apr. 9, 1991 to Kawamura (Assignee: Isuzu Ceramics Research Institute), U.S. Pat. No. 5,022,353 issued Jun. 11, 1991 to Kawamura (Assignee: Isuzu Ceramics Research Institute) and U.S. Pat. No. 5,113,805 issued May 19, 1992 to Kawamura.

Other available cylinder disabling devices are software for rendering fuel injectors of the engine inoperable. Control systems operable on such software are disclosed, for example, in U.S. Pat. No. 4,550,704 issued Nov. 5, 1985 to Barbo et al. (Assignee: Robert Bosch GmbH), and U.S. Pat. No. 5,540,633 issued Jul. 30, 1996 to Yamanaka et al. (Assignee: Toyota Jidosha Kabushiki Kaisha).

U.S. Pat. No. 5,562,086 issued Oct. 8, 1996 to Asada et al. (Assignee: Toyota Jidosha Kabushiki Kaisha), which is substantially identical in content with JP-A H8-74610, discloses an improvement in a control system for a variable displacement engine. JP-A H6-159110 published Jun. 7, 1994 discloses a control system for a variable displacement engine wherein disabled cylinders are replaced with the other cylinders during operation on less than the full complement of cylinders for smooth shift to engine operation on all of the cylinders.

As shown in FIG. 1, control unit 10 operates electronic throttle operator 34, which may comprise stepper motor or other type of devices used for positioning electronic throttle 36. Control unit 10 operates electronic EGR operator 38, which may comprise stepper motor or other types of devices for positioning EGR control valve 40. Air entering intake passage 42 first passes through cross sectional area provided by electronic throttle 36 before entering intake manifold 44. The flowing air is distributed to intake ports 50 for admission during induction stroke of pistons 46 in cylinders 48. Exhaust gases resulting from combustions in power strokes of pistons 46 are discharged out of exhaust ports 52 toward catalytic converter 54 and then to muffler 56.

Figure 2:
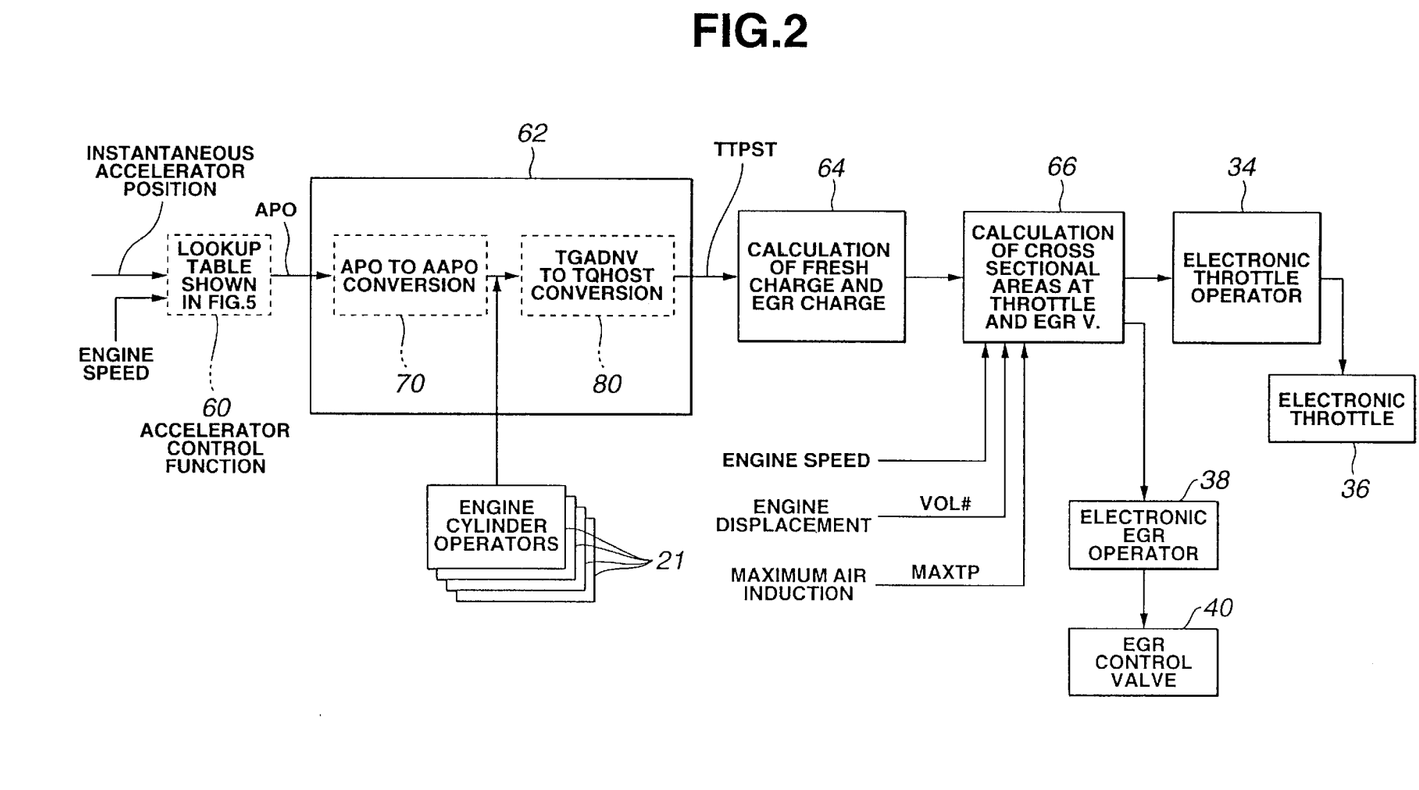
FIG. 2 is a control diagram showing EGR control and throttle control based on determination of a target value of volumetric airflow ratio (TQHOST) corresponding to an instantaneous accelerator position.
Figure 5:
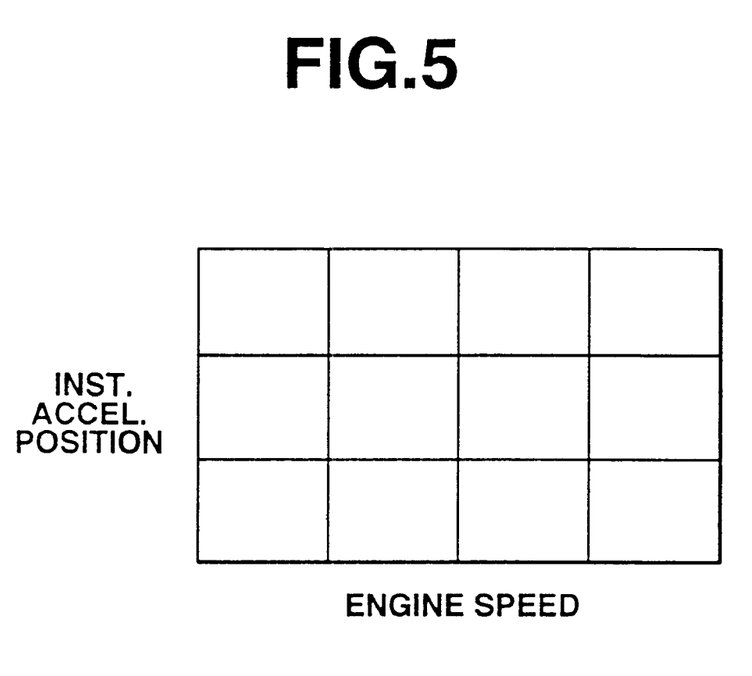
FIG. 5 is a schematic representation of a lookup table that may be incorporated in the system shown in FIG. 2.

Referring to control diagrams shown in FIG. 2, control unit 10 may use an accelerator control position function 60. Accelerator control function 60 enters an electronic throttle position (APO) lookup table as shown in FIG. 5. The lookup table of FIG. 5 combines the instantaneous position of accelerator pedal 16 with engine speed. If desired, the lookup table of FIG. 5 may combine not only the instantaneous position of accelerator pedal 16, but also the time rate of change or velocity of the pedal 16. In this case, when the driver steps aggressively on the pedal, the accelerator control function will have a different value than when the driver moves the pedal 16 in a more leisurely fashion. The value of the electronic throttle position (APO) drawn from the lookup table will reflect the aggressive or more phlegmatic characteristics of the driver.

Figure 6:
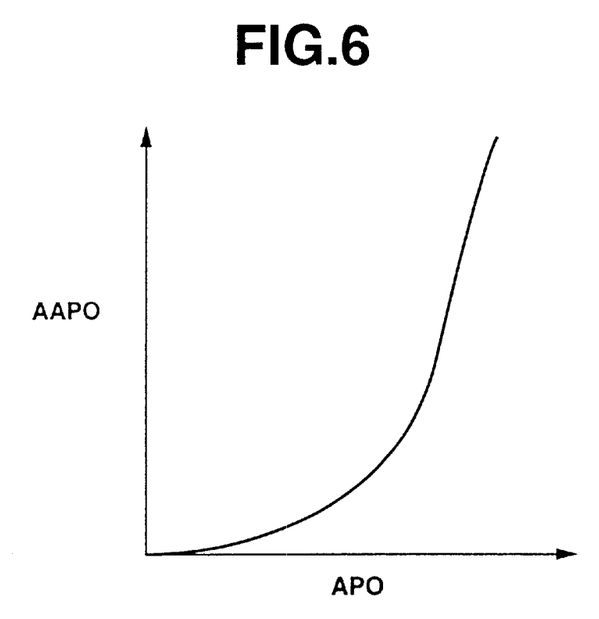
FIG. 6 is a graphical representation of a cross sectional area (AAPO) versus throttle position (APO) variation characteristic, which makes data of an APO to AAPO conversion lookup table incorporated in the system shown in FIG. 3.

Electronic throttle position APO is used as an input to a block 62. At block 62, control unit 10 determines a target value of volumetric airflow ratio TQHOST and calculates the product of volumetric airflow ratio TQHOST and maximum air induction MAXTP to give the result as a target base airflow TTPST. Control unit 10 uses a lookup table for conversion from APO to cross sectional area AAPO as indicated by a block 70. The relationship between the cross sectional area AAPO and throttle position APO can be expressed by the fully drawn characteristic function as shown in FIG. 6. The value in the lookup table used by control unit 10 for APO to AAPO conversion reflects the characteristic curve of FIG. 6. Control unit 10 inputs engine displacement VOL# and engine speed and use them in deriving effective flow cross sectional area TGADNV. There is a predetermined function between effective flow cross sectional area TGADNV and cross sectional area AAPO. Effective cross sectional area TGADNV can be expressed as:

$$\text{TGADNV}=(\text{AAPO})(\text{VOL\#})^{-1} \text{ (Engine Speed)}^{-1} \quad (1).$$

This predetermined function holds when the engine operates at is full cylinders with stokes in its standard cycle.

Figure 7:
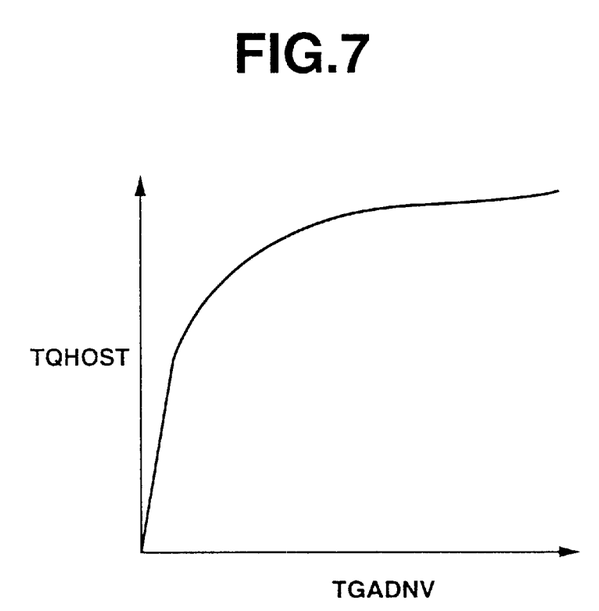
FIG. 7 is a graphical representation of various target values of volumetric airflow ratio (TQHOST) against various values of a parameter indicating effective flow cross section area (TGADNV).

Control unit 10 stores in ROM the number of strokes in a standard cycle ($N_{BSTRK}$), e.g., four if a standard cycle is four-stroke cycle. Control unit 10 stores in ROM information as to the number of deactivated or disabled cylinders ($N_{DACT}$) as well as information as to the number of strokes in a current cycle ($N_{STRK}$). Control unit 10 derives a correction factor based on such information stored in ROM. Control unit 10 modifies the predetermined function such correction factor to give effective flow cross sectional area TGADNV. At a block 80, control unit 10 uses a lookup table reflecting the relationship as shown in FIG. 7 for conversion of TGADNV to volumetric airflow ratio TGHOST.

The block 62 outputs the product of volumetric airflow ratio TGHOST and maximum air induction MAXTP as target base airflow TTPST.

Target base airflow TTPST is used as an input to a block 64, At a block 64, control unit 10 calculates the volume of fresh charge and the volume of EGR charge to be admitted to the engine cylinders is used as an input to a target throttle control position command generator 66. The results of calculation at block 64 are used as input to a block 66. At block 66, control unit 10 calculates cross sectional area to be provided at throttle 36 and cross sectional area to be provided at EGR control valve 40. The calculated cross sectional areas are converted to a target throttle control position and a target EGR valve control position. The block 66 receives engine speed, engine displacement VOL# and maximum air induction MAXTP. Control unit 10 uses such input information to determine the cross sectional areas at the throttle 36 and the EGR valve 40, respectively. Control unit 10 operates electronic throttle operator 34 to position electronic throttle 36 to the target throttle control position and operates electronic EGR operator 38 to position electronic EGR control valve 40.

Figure 3:
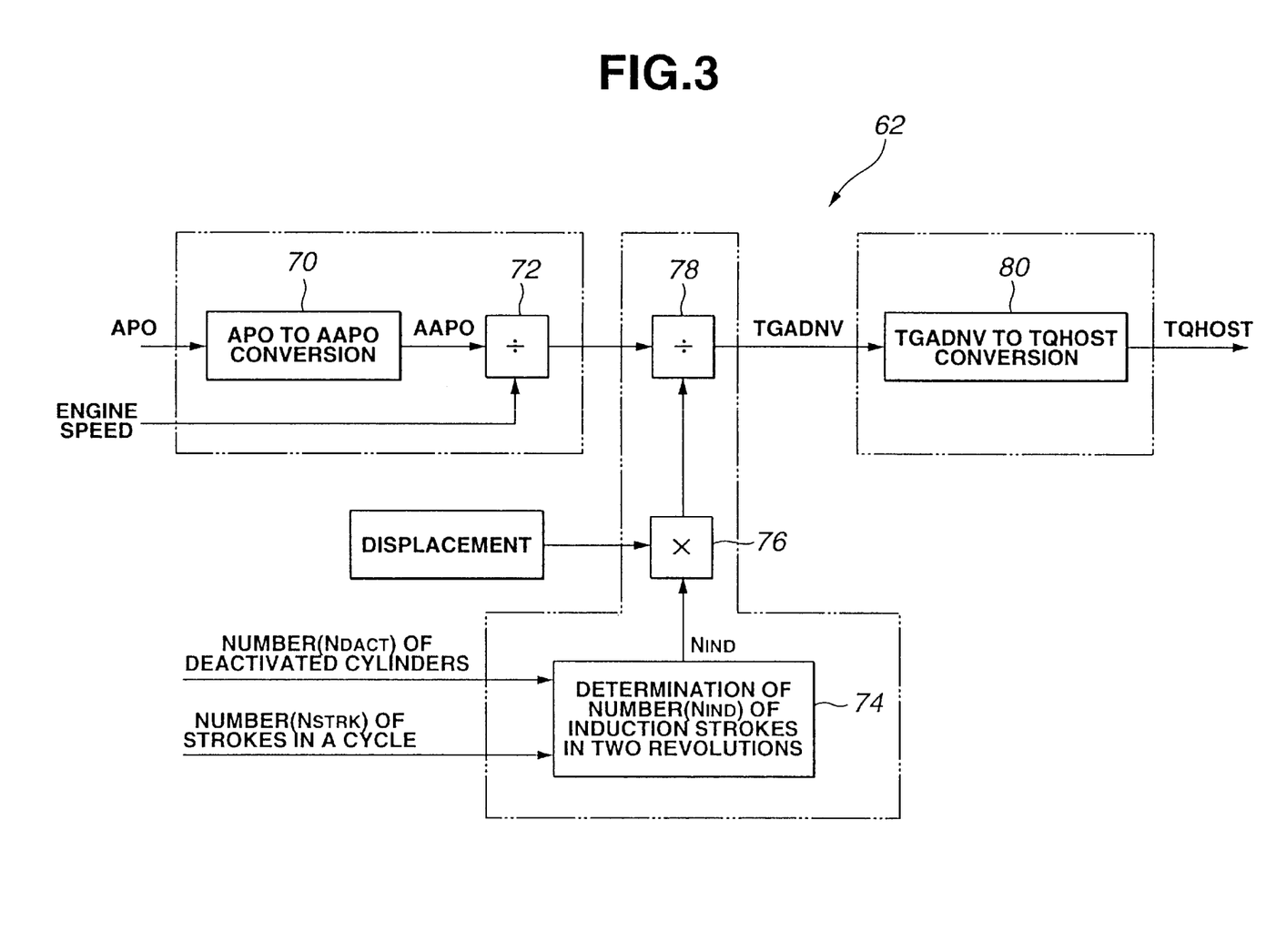
FIG. 3 is a control diagram showing, as a first example, a system for determining the target value of volumetric airflow ratio (TQHOST)

The calculation of TGADNV at block 62 can be understood with reference to control diagram shown in FIG. 3. Cross sectional area MPO [cm$^2$] that has been determined as a function (see FIG. 6) of electronic throttle position APO [degrees] is divided at a divider block 72 by engine speed to give a value [cm$^2$rpm $^{-1}$]. Number ($N_{DACT}$) of deactivated cylinders and number ($N_{STRK}$) of strokes in a current cycle are used as inputs to a block 74. At block 74, control unit 10 performs determination of number ($N_{IND}$) of induction strokes in two crankshaft revolutions. At a multiplier block 76, control unit 10 calculates the product of displacement [cc] and the determined number $N_{IND}$ of induction strokes in two crankshaft revolutions to give an effective engine displacement (=displacement×$N_{IND}$). At a divider block 78, control unit 10 divides the value from the divider block 72 by the value from the multiplier block 76 to give effective flow cross sectional area TGADNV [cm²rpm⁻¹cc⁻¹], which is used as the input of block 80 (see FIG. 2).

Figure 4:
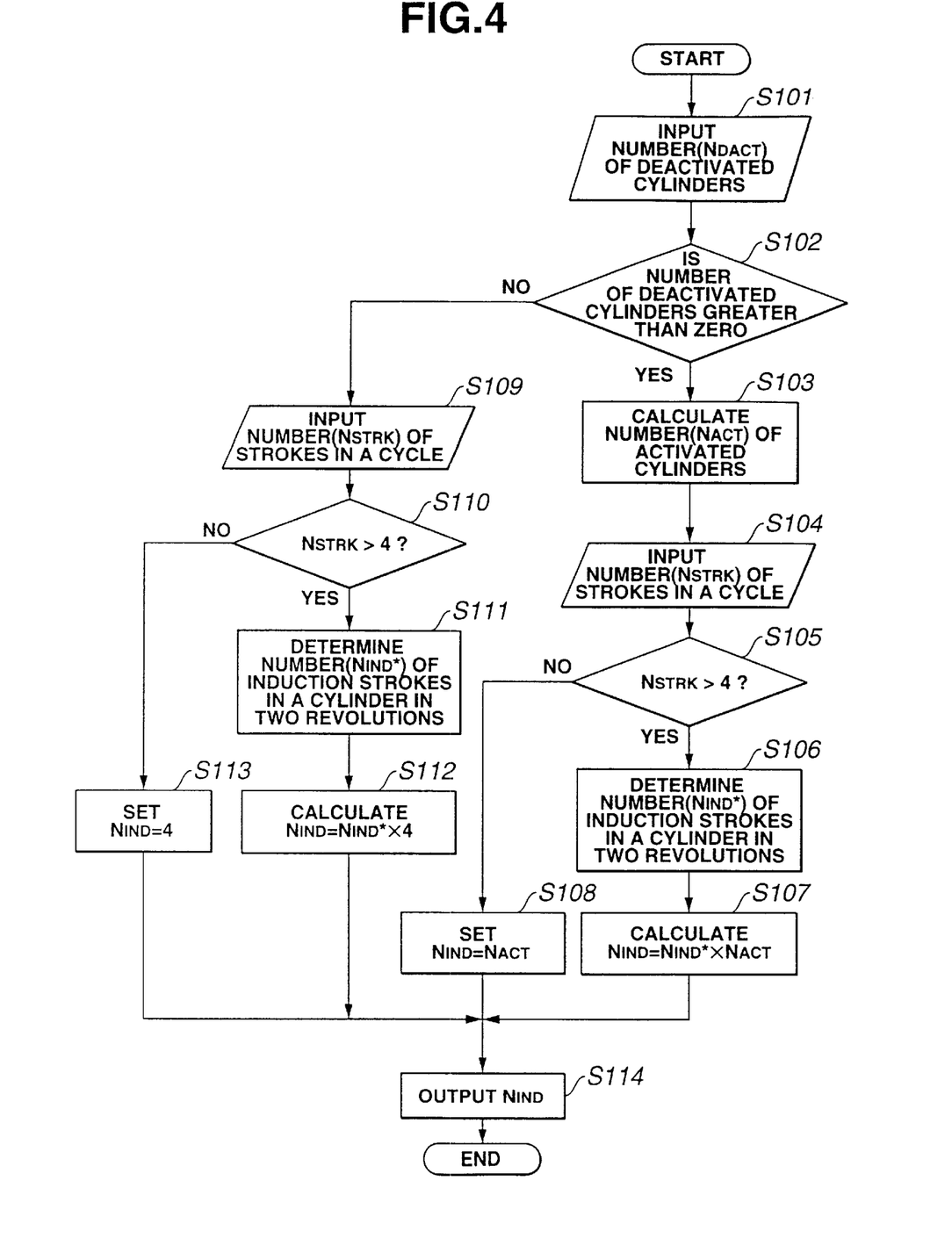
FIG. 4 is a flow chart of a control routine implementing the manner of determining number of induction stroke events in two crankshaft revolutions.

The flow chart of FIG. 4 illustrates a control routine of determination of number $N_{IND}$ of induction strokes in two crankshaft revolutions (at block 74 in FIG. 3).

In FIG. 4, at step S101, control unit 10 inputs number $N_{DACT}$ of deactivated cylinders from its ROM. At interrogation step S102, control unit 10 determines whether or not number $N_{DACT}$ of deactivated cylinders is greater than zero. If this is the case, the engine is operating on cylinders less than the full complement of cylinders and the routine proceeds to step S103.

If this is not the case, the engine is operating on all the cylinders and the routine proceeds to step S109, At step 5103, control unit 10 calculates number $N_{ACT}$ of activated cylinders by subtracting number $N_{DACT}$ from 4, which is the number of cylinders of the engine. At the next step S104, control unit 10 inputs number ($N_{STRK}$) of strokes in a current cycle from its ROM. Then, the routine proceeds to interrogation step S105.

At interrogation step S105, control unit 10 determines whether or not number $N_{STRK}$ of strokes in current cycle is greater than the basic number of strokes $N_{BSTRK}$ (=4) in a 4-stroke cycle. If this is the case, the engine is operating with 8-stroke or 16-stroke cycle and routine proceeds to step S106. If this is not the case, the engine is operating with 4-stroke cycle and the routine proceeds to step S108.

At step S106, control unit 10 determines number $N_{IND*}$ of induction strokes in a cylinder in two crankshaft revolutions by retrieving information in its ROM. As shown in FIG. 8, if the engine is operating with 4-stroke cycle, the number $N_{IND*}$ is 1 (=4/4). If the engine is operating with 8-stroke cycle, the number $N_{IND}$ is 0.5 (=4/8). If the engine is operating with 16-stroke cycle, the number $N_{IND*}$ is 0.25 (=4/16). In general, the number $N_{IND*}$ can be expressed by a ratio $N_{BSTRK}/N_{STRK}$. Routine proceeds from step S106 to step S107.

At step S107, control unit 10 determines the number $N_{IND}$ by calculating the equation $N_{IND}=N_{IND*} \times N_{ACT}$.

At step S108, since the number $N_{STRK}$ is the same as $N_{BSTRK}$ (=4, in this example), control unit 10 sets $N_{IND}$ equal to $N_{ACT}$.

If, at step S102, control unit 10 determines that the engine is operating on all of the cylinders (four cylinders, in this example), the routine proceeds to step S109. At step S109, control unit 10 inputs number ($N_{STRK}$) of strokes in a current cycle from its ROM Then, the routine proceeds to interrogation step S110.

At interrogation step S110, control unit 10 determines whether or not number $N_{STRK}$ of strokes in current cycle is greater than the basic number of strokes $N_{BSTRK}$ (=4) in a 4-stroke cycle. If this is the case, the engine is operating with 8-stroke or 16-stroke cycle and routine proceeds to step S111. If this is not the case, the engine is operating with 4-stroke cycle and the routine proceeds to step S113.

At step S111, control unit 10 determines number $N_{IND*}$ of induction strokes in a cylinder in two crankshaft revolutions in the same manner as performed at step S106. Routine proceeds from step S111 to step S112.

At step S112, control unit 10 determines the number $N_{IND}$ by calculating the equation $N_{IND}=N_{IND*} \times 4$ (=$N_{ACT}$).

At step S113, since the number $N_{STRK}$ is the same as $N_{BSTRK}$ (=4, in this example), control unit 10 sets $N_{IND}$ equal to 4 (=$N_{ACT}$). At step S114, control unit 10 outputs $N_{IND}$.

Referring back to FIG. 3, engine speed that is used at block 72 to divide cross sectional area AAPO remains uncorrected, while displacement used at block 78 to divide the output of the block 72 is corrected in response to the number $N_{DACT}$ of deactivated cylinders and the number $N_{STRK}$ of stroked in a current cycle. Another possibility is to leave the total of displacements of cylinders uncorrected and correct engine speed in determining effective flow cross sectional area TGADNV. This is further described in connection with FIG. 9.

Figure 9:
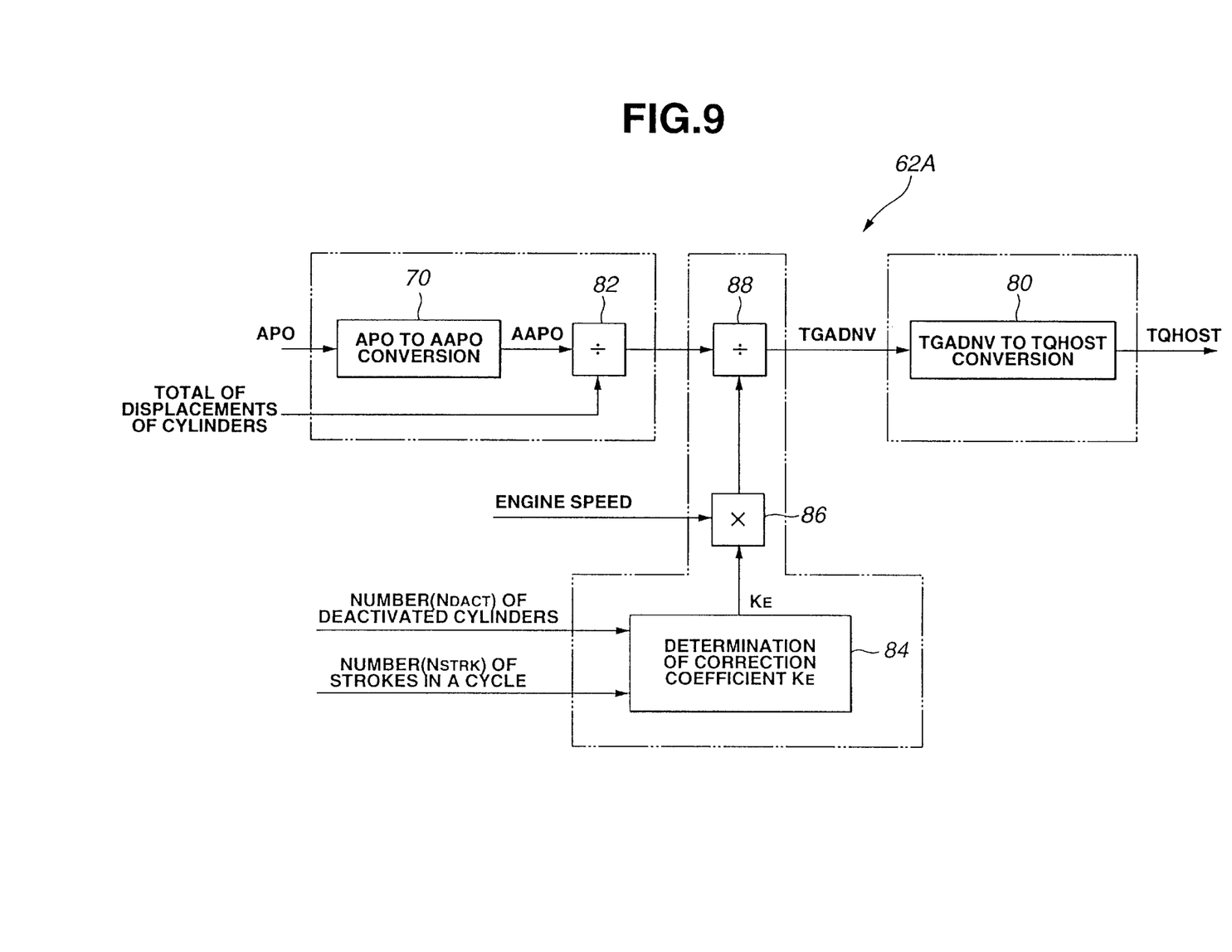
FIG. 9 is a control diagram showing, as a second example, a system for determining a target value of volumetric airflow ratio (TQHOST).

FIG. 9 illustrates a target airflow command generator 62A that may replace that of FIG. 3. The same reference numerals and characters are used throughout FIGS. 3 and 9 for ease of comparison. In FIG. 9, cross sectional area AAPO that has been determined at block 70 is divided at block 82 by total of displacements of cylinders of the engine. Number ($N_{DACT}$) of deactivated cylinders and number ($N_{STRK}$) of strokes in a current cycle are used as inputs to a block 84. At block 84, control unit 10 performs determination of a correction coefficient $K_E$. At a multiplier block 86, control unit 10 calculates the product of engine speed and the determined correction coefficient $K_E$. At divider block 88, control unit 10 divides the value from block 82 by the value from multiplier block 86 to give effective flow cross sectional area TGADNV.

Figure 10:
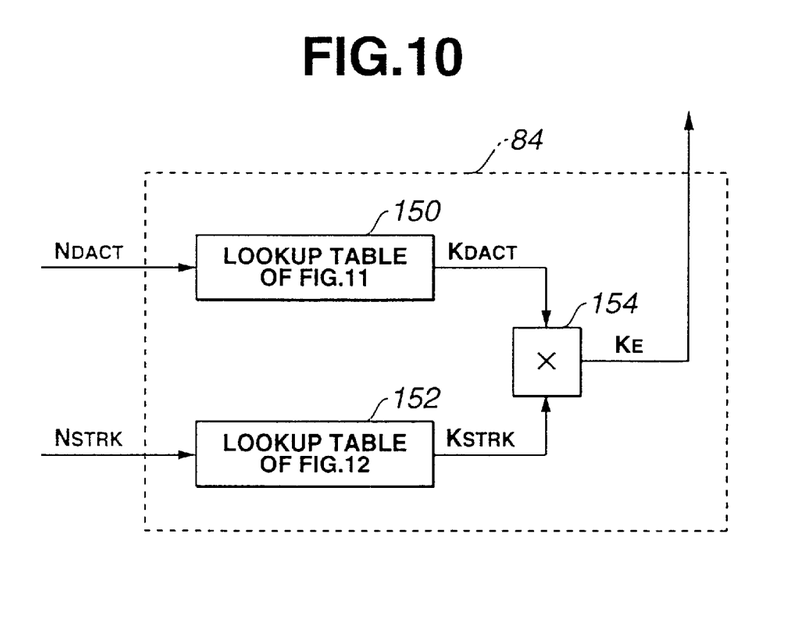
FIG. 10 is a control diagram of a block 84 for determination of correction coefficient ($K_E$).
Figure 11:
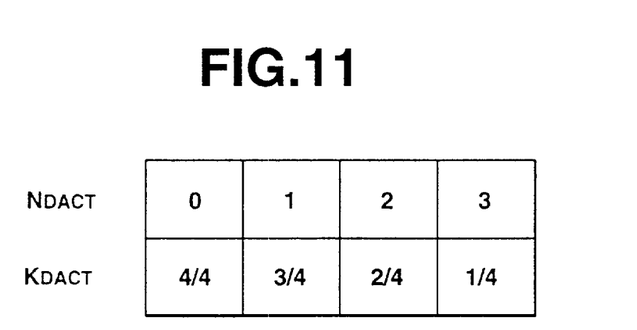
FIGS. 11 and 12 are schematic representations of lookup tables that may be incorporated in the control diagram shown in FIG. 10.
Figure 12:
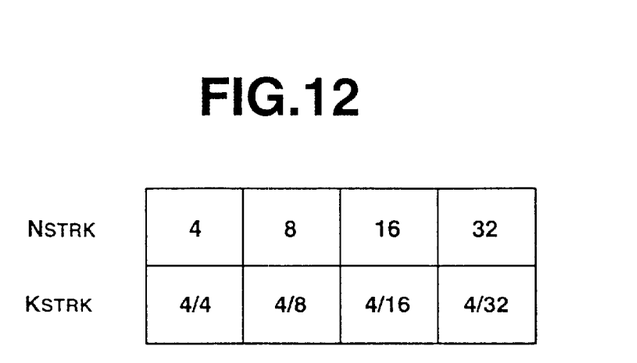

Referring to FIGS. 10, 11 and 12, description is made on the manner of determining correction coefficient $K_E$. In FIG. 10, at a block 150, control unit 10 performs a table lookup operation of a table shown in FIG. 11 using $N_{DACT}$ to determine a first coefficient $K_{DACT}$. At a block 152, control unit 10 performs a table lookup operation of a table shown in FIG. 12 using $N_{STRK}$ to determine a second coefficient $K_{KSTRK}$. At a multiplier block 154, control unit 10 calculates the product $K_{DACT} \times K_{KSTRK}$ to give the result as correction coefficient $K_E$.

Referring to the lookup table in FIG. 11, the number of engine cylinders, 4 in this example, is set as a denominator and the number of activated cylinders is set as a numerator to make a value of the first coefficient $K_{DACT}$ corresponding to the value of $N_{DACT}$. Referring to the lookup table in FIG. 12, the number $N_{STRK}$ of strokes in a current cycle is set as a denominator and the number of strokes in a 4-stroke cycle is set as a numerator to make a value of the second coefficient $K_{STRK}$ corresponding to the value of $N_{SREK}$.

Figure 13:
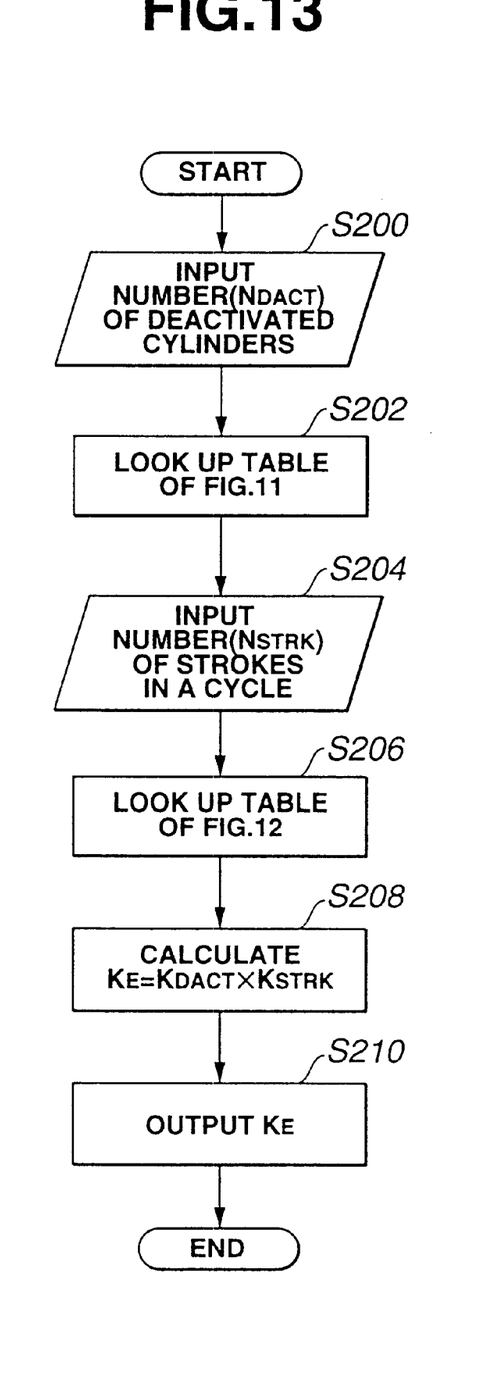
FIG. 13 is a flow chart of a control routine implementing the manner of determining a correction coefficient ($K_E$).

The flow chart of FIG. 13 illustrates a control routine of determination of correction coefficient $K_E$ using lookup tables shown in FIGS. 11 and 12. At step S200, control unit 10 inputs $N_{DACT}$. At the next step S202, control unit 10 determines first coefficient $K_{DACT}$ by performing a table lookup operation of table shown in FIG. 11 using $N_{DACT}$. At step S204, control unit 10 inputs $N_{STRK}$, At step S206, control unit 10 determines second coefficient $K_{STRK}$ by performing a table lookup operation of table shown in FIG. 12 using $N_{STRK}$. At step S208, control unit 10 calculates the product $K_{DACT} \times K_{STRK}$ to give the result as correction coefficient $K_E$. At step S210, control unit 10 outputs the determined correction coefficient $K_E$.

Figure 14:
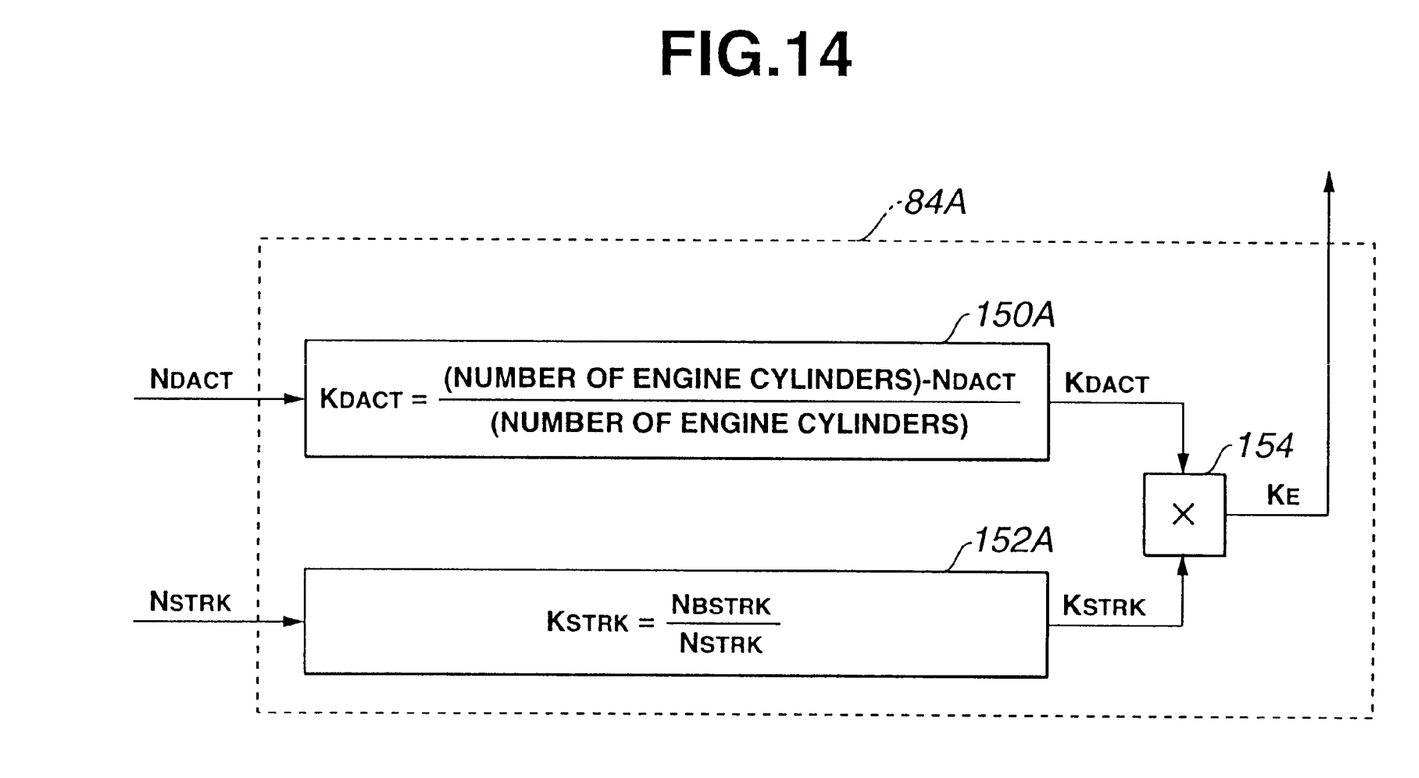
FIG. 14 is a similar control diagram to FIG. 10, illustrating other manner of determining correction coefficient ($K_E$).

FIG. 14 is a similar control diagram to FIG. 10. As different from FIG. 10, without relying on the lookup tables, first and second coefficients $K_{DACT}$ and $K_{STRK}$ are given by calculating equations. At block 150A, control unit 10 calculates the following equation to give first coefficient $K_{DACT}$, $$K_{DACT} = \{(\text{Number of engine cylinders}) - N_{DACT}\}/(\text{Number of engine cylinders}) \qquad (1).$$

At block 152A, control unit 10 calculates the following equation to give second coefficient $K_{STRK}$, $$K_{STRK} = N_{BSTRK}/N_{STRK} \qquad (2),$$

where $N_{BSTRK}$ represents the number of strokes in a standard cycle.

At block 154, control unit calculates the product $K_{DACT} \times K_{STRK}$ to give the result as correction coefficient $K_E$.

Figure 15:
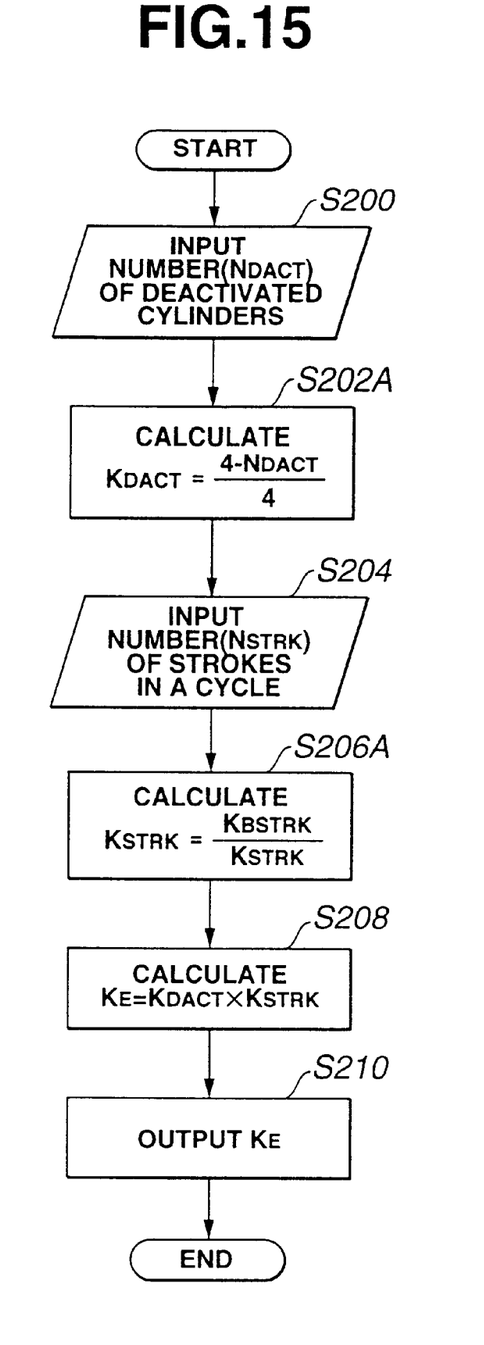
FIG. 15 is a flow chart of a control routine implementing the manner of determining the correction coefficient ($K_E$) without relying on the lookup tables of FIGS. 11 and 12.

The flow chart of FIG. 15 illustrates a control routine implementing the manner of determining correction coefficient $K_E$ using the above-mentioned equations. At step S200, control unit 10 inputs $N_{DACT}$. At the next step S202A, control unit 10 determines first coefficient $K_{DACT}$ by calculating the equation (1). At step S204, control unit 10 inputs $N_{STRK}$. At step S206A, control unit 10 determines second coefficient $K_{STRK}$ by calculating the equation (2). At step S208, control unit 10 calculates the product $K_{DACT} \times K_{STRK}$ to give the result as correction coefficient $K_E$. At step S210, control unit 10 outputs the determined correction coefficient $K_E$.

Figure 16:
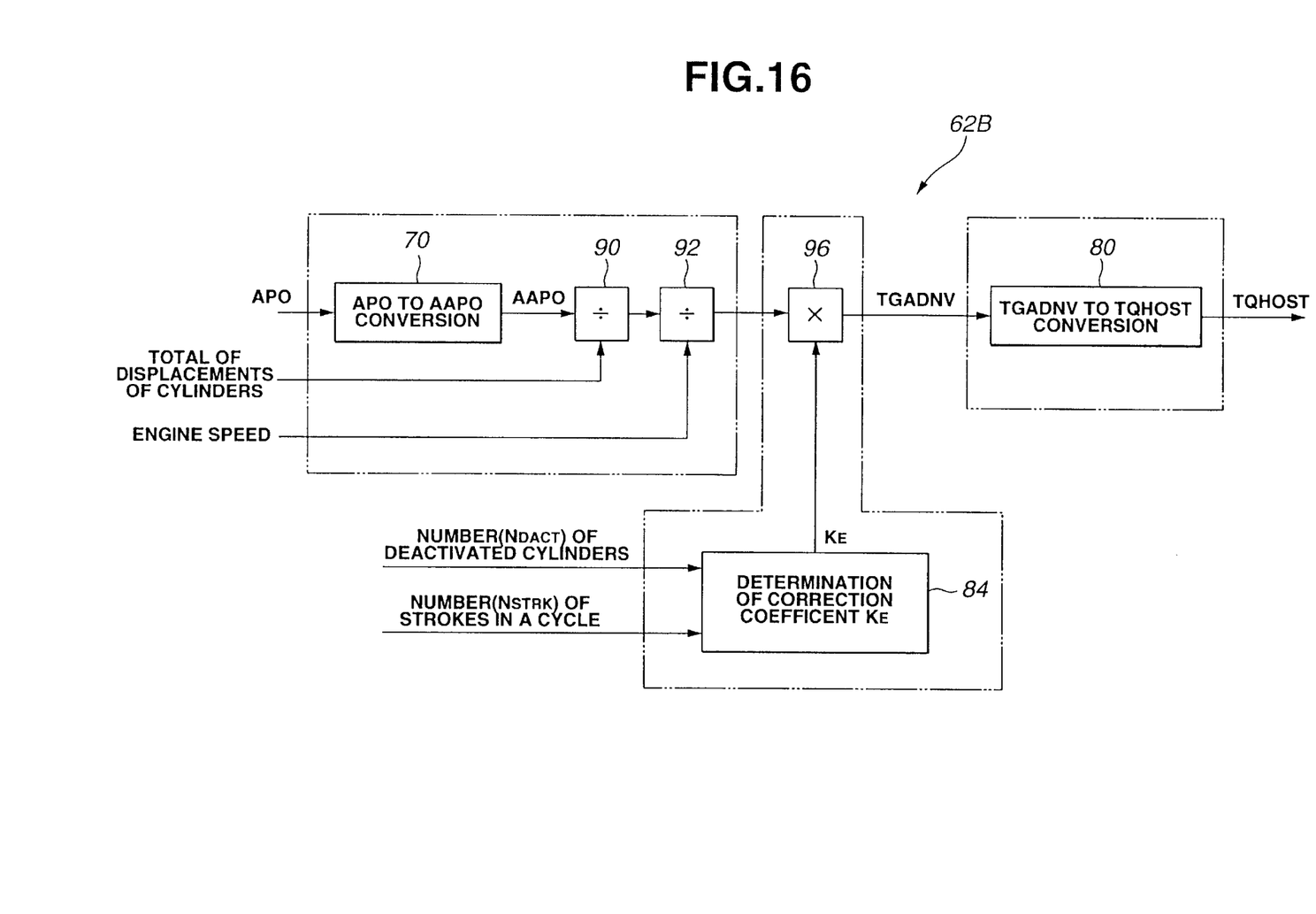
FIG. 16 is a control diagram showing, as a third example, a system for determining a target value of volumetric airflow ratio (TQHOST).

In target airflow command generator 62A shown in FIG. 9, engine speed was corrected with correction coefficient $K_E$. Referring to FIG. 16, a target airflow command generator 62B is different from generator 62A in that engine speed is not corrected and correction coefficient $K_E$ is multiplied with a value resulting from a divider block 92.

In FIG. 16, cross sectional area AAPO that has been determined at block 70 is divided at block 90 by total of displacements of cylinders of the engine. Number ($N_{DACT}$) of deactivated cylinders and number ($N_{STRK}$) of strokes in a current cycle are used as inputs to a block 84. At block 92, the value from block 90 is divided by engine speed, At block 96, control unit 10 multiplies the value from block 92 with correction coefficient $K_E$ to give effective flow cross sectional area TGADNV.

While the present invention has been particularly described in conjunction with the preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The content of disclosure of Japanese Patent Application No. 11-294338, filed Oct. 15, 1999 is hereby incorporated by reference in its entirety.

What is claimed is:

1. A control system for an internal combustion engine having a plurality of cylinders, comprising:

engine cylinder operator means for varying displacement of the engine cylinders;

means generating a cross sectional area against a given throttle position out of stored various cross sectional areas against various throttle positions;

means for determining an effective flow cross sectional area as a predetermined function of said cross sectional area;

means for generating a maximum airflow ratio corresponding to said effective flow cross sectional area; and means for modifying said predetermined function in response to a change in displacement of the engine cylinders.

2. The control system as claimed in claim 1, wherein said cylinder operator means deactivate and reactivate at least some of the engine cylinders, and said predetermined function modifying means use the number of cylinders being activated in modifying said predetermined function.

3. The control system as claimed in claim 2, wherein said cylinder operator means include electromagnetic valve operators for opening and closing cylinder valves.

4. The control system as claimed in claim 1, wherein said cylinder operator means vary the number of strokes in a cycle, and said predetermined function modifying means calculate a ratio between the number of strokes in a current cycle and the number of strokes in a standard cycle and use said ratio in modifying said predetermined function.

5. The control system as claimed in claim 4, wherein said cylinder operator means include electromagnetic valve operators for opening and closing cylinder valves.

6. A method of calculating airflow entering a multicylinder internal combustion engine, the method comprising:

deactivating and reactivating at least some of the engine cylinders;

generating a cross sectional area against a given throttle position out of stored various cross sectional areas against various throttle positions;

determining an effective flow cross sectional area as a predetermined function of said cross sectional area;

generating a volumetric airflow ratio corresponding to said effective flow cross sectional area; and modifying said predetermined function in response to the number of cylinder being activated.

7. A method of calculating airflow entering a multicylinder internal combustion engine, the method comprising:

varying the number of strokes in a cycle of the engine cylinders;

determining the number of strokes in a current cycle;

generating a cross sectional area against a given throttle position out of stored various cross sectional areas against various throttle positions;

determining an effective flow cross sectional area as a predetermined function of said cross sectional area;

generating a volumetric airflow ratio corresponding to said effective flow cross sectional area; and modifying said predetermined function in response to the determined number of strokes in current cycle.

8. A control system for an internal combustion engine having a plurality of cylinders, comprising:

engine cylinder operator means for deactivating and reactivating the engine cylinders; and a control unit connected with said engine cylinder operator means, said control unit generating a cross sectional area against a given throttle position out of stored various cross sectional areas against various throttle positions;

said control unit determining an effective flow cross sectional area as a predetermined function of said cross sectional area;

said control unit generating a volumetric airflow ratio corresponding to said effective flow cross sectional area; and said control unit modifying said predetermined function in response to the number of engine cylinders being activated.

9. The control system as claimed in claim 8, wherein said engine cylinder operator means include electromagnetic valve operators for opening and closing cylinder valves.

10. A control system for an internal combustion engine having a plurality of cylinders, comprising:

engine cylinder operator means for varying the number of strokes in a cycle; and a control unit connected with said engine cylinder operator means, said control unit generating a cross sectional area against a given throttle position out of stored various cross sectional areas against various throttle positions;

said control unit determining an effective flow cross sectional area as a predetermined function of said cross sectional area;

said control unit generating a volumetric airflow ratio corresponding to said effective flow cross sectional area; and said control unit modifying said predetermined function in response to the number of strokes in cycle.

11. The control system as claimed in claim 10, wherein said control unit calculates a ratio between the number of strokes in a current cycle and the number of strokes in a standard cycle and uses said ratio in modifying said predetermined function.

12. The control system as claimed in claim 10, wherein said engine cylinder operator means include electromagnetic valve operators for opening and closing cylinder valves.

13. The control system as claimed in claim 10, wherein said control unit gives a throttle position in response to an accelerator control position of a manually operable accelerator.

14. A control system for an internal combustion engine having a plurality of cylinders, comprising:

engine cylinder operator means for deactivating and reactivating the engine cylinders and varying the number of strokes in a cycle; and a control unit connected with said engine cylinder operator means, said control unit generating a cross sectional area against a given throttle position out of stored various cross sectional areas against various throttle positions;

said control unit determining an effective flow cross sectional area as a predetermined function of said cross sectional area;

said control unit generating a volumetric airflow ratio corresponding to said effective flow cross sectional area;

said control unit calculates the product of the volumetric airflow ratio and a maximum air induction to give the result as a target base airflow; and said control unit modifying said predetermined function in response to the number of engine cylinders being activated and the number of strokes in cycle.

15. The control system as claimed in claim 14, wherein said control unit calculates a ratio between the number of strokes in a current cycle and the number of strokes in a standard cycle and uses said ratio in modifying said predetermined function.

16. The control system as claimed in claim 14, wherein, when all of the engine cylinders are being activated with strokes in the standard cycle, said predetermined function is expressed such that the effective flow cross sectional area is equivalent to the cross sectional area divided by the total of displacements of the engine cylinders and also by engine speed.

* * * * *